US 6,684,711 B2

(12) United States Patent
Wang (10) Patent No.: US 6,684,711 B2
(45) Date of Patent: Feb. 3, 2004

(54) THREE-PHASE EXCITATION CIRCUIT FOR COMPENSATED CAPACITOR INDUSTRIAL PROCESS CONTROL TRANSMITTERS

(75) Inventor: Rongtai Wang, Edina, MN (US)

(73) Assignee: Rosemount Inc., Eden Prairie, MN (US)

( * ) Notice: Subject to any disclaimer, the term of this patent is extended or adjusted under 35 U.S.C. 154(b) by 335 days.

(21) Appl. No.: 09/939,079

(22) Filed: Aug. 23, 2001

(65) Prior Publication Data

US 2003/0056597 A1 Mar. 27, 2003

(51) Int. Cl.⁷ .................................. G01L 9/12
(52) U.S. Cl. .................. 73/724; 73/718; 73/715; 73/700; 361/283.1; 361/283.2; 361/283.3; 361/283.4
(58) Field of Search ....... 73/700–756; 361/283.1–283.4

(56) References Cited

U.S. PATENT DOCUMENTS

| 3,701,280 A | 10/1972 | Stroman ...................... 73/194 |
| 3,968,694 A | 7/1976 | Clark .......................... 73/398 |
| 4,120,206 A | 10/1978 | Rud, Jr. ....................... 73/718 |
| 4,125,027 A | 11/1978 | Clark .......................... 73/724 |
| 4,238,825 A | 12/1980 | Geery ......................... 364/510 |
| 4,250,490 A | 2/1981 | Dahlke .................. 340/870.37 |
| 4,287,501 A | 9/1981 | Tominaga et al. ............. 338/42 |
| 4,414,634 A | 11/1983 | Louis et al. ................. 364/510 |
| 4,419,898 A | 12/1983 | Zanker et al. ............. 73/861.02 |

(List continued on next page.)

FOREIGN PATENT DOCUMENTS

| DE | 34 41 648 A1 | 12/1987 |
| DE | G 91 09 176 | 10/1991 |
| DE | 197 45 244 A1 | 4/1998 |
| DE | 299 03 260 U1 | 5/2000 |
| EP | 0 063 685 A1 | 11/1982 |
| EP | 0 167 941 | 6/1985 |
| EP | 0 214 801 A1 | 3/1987 |
| EP | 0 223 300 A2 | 5/1987 |
| EP | 0 268 742 A1 | 6/1988 |
| EP | 0 903 651 A1 | 3/1999 |
| JP | 2000121470 | 10/1998 |
| WO | WO 88/01417 | 2/1988 |
| WO | WO 89/02578 | 3/1989 |
| WO | WO 89/04089 | 5/1989 |
| WO | WO 90/15975 | 12/1990 |
| WO | WO 91/18266 | 11/1991 |
| WO | WO 96/34264 | 10/1996 |
| WO | WO 98/48489 | 10/1998 |
| WO | WO 00/23776 | 4/2000 |

OTHER PUBLICATIONS

U.S. patent application Ser. No. 09/671,495, Behm et al., filed Sep. 27, 2000.
U.S. patent application Ser. No. 09/519,781, Neslon et al., filed Mar. 7, 2000.

(List continued on next page.)

Primary Examiner—Edward Lefkowitz
Assistant Examiner—Jermaine L Jenkins
(74) Attorney, Agent, or Firm—Westman, Champlin & Kelly (57) ABSTRACT

A capacitor industrial process control transmitter includes a three-phase excitation circuit to charge a sensing capacitor and a compensation capacitor of the transmitter and transfer charges to an integrator. The sensing capacitor is charged during the first phase. During the second phase, the voltage to the sensing capacitor is reversed, and the charge on the sensing capacitor is pumped to the integrator. Also, the compensation capacitor is charged with the reversed voltage during the second phase. During the third phase, the voltage to the compensation capacitor is changed, and the charge on the compensation capacitor is pumped to the integrator.

21 Claims, 7 Drawing Sheets

U.S. PATENT DOCUMENTS

| | | | |
|---|---|---|---|
| 4,446,730 A | 5/1984 | Smith | 73/301 |
| 4,455,875 A | 6/1984 | Guimard et al. | 73/708 |
| 4,485,673 A | 12/1984 | Stern | 73/304 |
| 4,528,855 A | 7/1985 | Singh | 73/721 |
| 4,562,744 A | 1/1986 | Hall et al. | 73/861.02 |
| 4,598,381 A | 7/1986 | Cucci | 364/558 |
| 4,602,344 A | 7/1986 | Ferretti et al. | 364/509 |
| D287,827 S | 1/1987 | Broden | D10/46 |
| 4,644,797 A | 2/1987 | Ichikawa et al. | 73/706 |
| 4,653,330 A | 3/1987 | Hedtke | 73/756 |
| 4,677,841 A | 7/1987 | Kennedy | 73/30 |
| 4,745,810 A | 5/1988 | Pierce et al. | 73/706 |
| D296,995 S | 8/1988 | Lee | D10/46 |
| D297,314 S | 8/1988 | Hedtke | D10/46 |
| D297,315 S | 8/1988 | Pierce et al. | D10/85 |
| 4,783,659 A | 11/1988 | Frick | 340/870.37 |
| 4,791,352 A | 12/1988 | Frick et al. | 324/60 |
| 4,798,089 A | 1/1989 | Frick et al. | 73/706 |
| 4,818,994 A | 4/1989 | Orth et al. | 340/870.21 |
| 4,825,704 A | 5/1989 | Aoshima et al. | 73/861.42 |
| 4,833,922 A | 5/1989 | Frick et al. | 73/756 |
| 4,850,227 A | 7/1989 | Luettgen et al. | 73/708 |
| 4,866,989 A | 9/1989 | Lawless | 73/756 |
| 4,881,412 A | 11/1989 | Northedge | 73/861.04 |
| 4,930,353 A | 6/1990 | Kato et al. | 73/727 |
| 4,958,938 A | 9/1990 | Schwartz et al. | 374/208 |
| 4,970,898 A | 11/1990 | Walish et al. | 73/706 |
| 4,980,675 A | 12/1990 | Meisenheimer, Jr. | 340/626 |
| 5,000,047 A | 3/1991 | Kato et al. | 73/706 |
| D317,266 S | 6/1991 | Broden et al. | D10/46 |
| D317,269 S | 6/1991 | Selg | D10/52 |
| D318,432 S | 7/1991 | Broden et al. | D10/46 |
| 5,028,746 A | 7/1991 | Petrich | 191/12.2 R |
| 5,035,140 A | 7/1991 | Daniels et al. | 73/290 |
| 5,058,437 A | 10/1991 | Chaumont et al. | 73/861.41 |
| 5,060,108 A | 10/1991 | Baker et al. | 361/283 |
| 5,070,732 A | 12/1991 | Duncan et al. | 73/431 |
| 5,083,091 A | 1/1992 | Frick et al. | 324/678 |
| 5,087,871 A | 2/1992 | Losel | 323/299 |
| 5,094,109 A | 3/1992 | Dean et al. | 73/718 |
| D329,619 S | 9/1992 | Cartwright | D10/52 |
| 5,142,914 A | 9/1992 | Kusakabe et al. | 73/723 |
| 5,157,972 A | 10/1992 | Broden et al. | 73/718 |
| 5,162,725 A | 11/1992 | Hodson et al. | 324/115 |
| 5,187,474 A | 2/1993 | Kielb et al. | 340/870.18 |
| 5,227,782 A | 7/1993 | Nelson | 340/870.11 |
| 5,236,202 A | 8/1993 | Krouth et al. | 277/164 |
| 5,245,333 A | 9/1993 | Anderson et al. | 340/870.3 |
| 5,248,167 A | 9/1993 | Petrich et al. | 285/23 |
| D342,456 S | 12/1993 | Miller et al. | D10/60 |
| 5,287,746 A | 2/1994 | Broden | 73/706 |
| 5,353,200 A | 10/1994 | Bodin et al. | 361/816 |
| 5,369,386 A | 11/1994 | Alden et al. | 335/206 |
| 5,377,547 A | 1/1995 | Kusakabe et al. | 73/723 |
| 5,381,355 A | 1/1995 | Birangi et al. | 364/724.01 |
| D358,784 S | 5/1995 | Templin, Jr. et al. | D10/96 |
| 5,436,824 A | 7/1995 | Royner et al. | 363/89 |
| 5,448,180 A | 9/1995 | Kienzler et al. | 326/15 |
| 5,469,150 A | 11/1995 | Sitte | 340/825.07 |
| 5,471,885 A | 12/1995 | Wagner | 73/862.041 |
| D366,000 S | 1/1996 | Karas et al. | D10/60 |
| D366,218 S | 1/1996 | Price et al. | D10/52 |
| 5,495,768 A | 3/1996 | Louwagie et al. | 73/706 |
| 5,498,079 A | 3/1996 | Price | 374/208 |
| 5,524,333 A | 6/1996 | Hogue et al. | 29/593 |
| 5,524,492 A | 6/1996 | Frick et al. | 73/706 |
| 5,546,804 A | 8/1996 | Johnson et al. | 73/431 |
| 5,600,782 A | 2/1997 | Thomson | 395/182.02 |
| 5,606,513 A | 2/1997 | Louwagie et al. | 364/510 |
| 5,656,782 A | 8/1997 | Powell, II et al. | 73/756 |
| 5,665,899 A | 9/1997 | Willcox | 73/1.63 |
| 5,668,322 A | 9/1997 | Broden | 73/756 |
| 5,670,722 A | 9/1997 | Moser et al. | 73/756 |
| 5,710,552 A | 1/1998 | McCoy et al. | 340/870.21 |
| 5,754,596 A | 5/1998 | Bischoff et al. | 375/295 |
| 5,764,928 A | 6/1998 | Lanctot | 395/285 |
| 5,823,228 A | 10/1998 | Chou | 137/597 |
| 5,870,695 A | 2/1999 | Brown et al. | 702/138 |
| 5,899,962 A | 5/1999 | Louwagie et al. | 702/138 |
| 5,920,016 A | 7/1999 | Broden | 73/756 |
| 5,948,988 A | 9/1999 | Bodin | 73/706 |
| 5,954,526 A | 9/1999 | Smith | 439/136 |
| 5,955,684 A | 9/1999 | Gravel et al. | 73/866.5 |
| 5,973,942 A | 10/1999 | Nelson et al. | 363/21 |
| 5,988,206 A | 11/1999 | Bare et al. | 137/597 |
| 6,005,500 A | 12/1999 | Gaboury et al. | 341/43 |
| 6,006,338 A | 12/1999 | Longsdorf et al. | 713/340 |
| 6,038,927 A | 3/2000 | Karas | 73/706 |
| 6,050,145 A | 4/2000 | Olson et al. | 73/706 |
| 6,059,254 A | 5/2000 | Sundet et al. | 248/678 |
| 6,105,437 A | 8/2000 | Klug et al. | 73/756 |
| 6,111,888 A | 8/2000 | Green et al. | 370/461 |
| 6,115,831 A | 9/2000 | Hanf et al. | 714/43 |
| 6,123,585 A | 9/2000 | Hussong et al. | 439/652 |
| 6,140,952 A | 10/2000 | Gaboury | 341/143 |
| 6,216,172 B1 | 4/2001 | Kolblin et al. | 709/253 |
| 6,233,532 B1 | 5/2001 | Boudreau et al. | 702/89 |
| 6,285,964 B1 | 9/2001 | Babel et al. | 702/121 |
| 6,295,875 B1 | 10/2001 | Frick et al. | 73/718 |

OTHER PUBLICATIONS

U.S. patent application Ser. No. 09/520,292, Davis et al., filed Mar. 7, 2000.

U.S. patent application Ser. No. 09/519,912, Nelson et al., filed Mar. 7, 2000.

U.S. patent application Ser. No. 09/672,338, Nelson et al., filed Sep. 28, 2000.

U.S. patent application Ser. No. 09/638,181, Roper et al., filed Jul. 31, 2000.

U.S. patent application Ser. No. 09/571,111, Westfield et al., filed May 15, 2000.

U.S. patent application Ser. No. 09/564,506, Nord et al., filed May 4, 2000.

U.S. patent application Ser. No. 09/667,289, Westfield et al., filed Sep. 22, 2000.

U.S. patent application Ser. No. 09/667,399, Behm et al., filed Sep. 21, 2000.

U.S. patent application Ser. No. 09/671,130, Fandrey et al., filed Sep. 27, 2000.

U.S. patent application Ser. No. 29/120,531, Fandrey et al., filed Mar. 21, 2000.

U.S. patent application Ser. No. 29/120,544, Fandrey et al., filed Mar. 21, 2000.

U.S. patent application Ser. No. 29/120,538, Fandrey et al., filed Mar. 21, 2000.

U.S. patent application Ser. No. 29/120,552, Fandrey et al., filed Mar. 21, 2000.

U.S. patent application Ser. No. 29/120,537, Fandrey et al., filed Mar. 21, 2000.

U.S. patent application Ser. No. 29/120,553, Fandrey et al., filed Mar. 21, 2000.

Product Data Sheet No: 00813–0100–4378, "Model 751 Field Signal Indicator", by Rosemount Inc., Eden Prairie, Minnesota, (1997).

Product Data Sheet No: 00813–0100–4731, "APEX™ Radar Gauge", by Rosemount Inc., Eden Prairie, Minnesota, (1998).

Product Data Sheet No: 00813–0100–4640, "Model 3201 Hydrostatic Interface Unit", from the Rosemount Comprehensive Product Catalog, published 1998, by Rosemount Inc., Eden Prairie, Minnesota.
Product Data Sheet No: 00813–0100–4003, "Model 8800A", by Rosemount Inc., Eden Prairie, Minnesota, (1998).
Product Data Sheet No: 00813–0100–4773, "Model 8742C—Magnetic Flowmeter Transmitter with FOUNDATION™ Fieldbus", from the Rosemount Comprehensive Product Catalog, published 1998, by Rosemount Inc., Eden Prairie, Minnesota.
"Rosemount Model 8732C Magnetic Flowmeter Transmitter", by Rosemount Inc., Eden Prairie, Minnesota, (1998).
Product Data Sheet No: 00813–0100–4263, "Model 44 Alphaline® Temperature Transmitters", by Rosemount Inc., Eden Prairie, Minnesota, (1997).
Product Data Sheet No: 00813–0100–4769, "Model 3244MV Multivariable Temperature Transmitter with FOUNDATION™ Fieldbus", by Rosemount Inc., Eden Prairie, Minnesota, (1998).
Product Data Sheet No: 00813–0100–4724, "Models 3144 and 3244MV Smart Temperature Transmitters", by Rosemount Inc., Eden Prairie, Minnesota, (1998).
Product Data Sheet No: 00813–0100–4738, "Model 3095FB Multivariable™ Transmitter with Modbus™ Protocol", by Rosemount Inc., Eden Prairie, Minnesota, (1996, 1997).
Product Data Sheet No: 00813–0100–4001, "Model 3051 Digital Pressure Transmitter for Pressure, Flow, and Level Measurement", by Rosemount Inc., Eden Prairie, Minnesota, (1998).
Product Data Sheet No: 00813–0100–4698, "Model 2090F Sanitary Pressure Transmitter", by Rosemount Inc., Eden Prairie, Minnesota, (1998).
Product Data Sheet No: 00813–0100–4690, "Model 2088 Economical Smart Pressure Transmitter", by Rosemount Inc., Eden Prairie, Minnesota, (1998).
Product Data Sheet No: 00813–0100–4592, "Model 2024 Differential Pressure Transmitter", by Rosemount Inc., Eden Prairie, Minnesota, (1987–1995).
Product Data Sheet No: 00813–0100–4360, "Model 1151 Alphaline® Pressure Transmitters", by Rosemount Inc., Eden Prairie, Minnesota, (1998).
Product Data Sheet No: 00813–0100–4458, "Model 1135F Pressure–to–Current Converter", by Rosemount Inc., Eden Prairie, Minnesota, (1983, 1986, 1994).
"Single Chip Senses Pressure and Temperature," *Machine Design*, 64 (1992) May 21, No. 10.
Brochure: "Reduce Unaccounted–For Natural Gas with High–Accuracy Pressure Transmitters," Rosemount Inc. Measurement Division, Eden Prairie, Minnesota, ADS 3073, 5/91, pp. 1–4.
Technical Information Bulletin, "Liquid Level Transmitter Model DB40RL Sanitary Sensor *Deltapilot*," Endress+Hauser, Greenwood, Indiana, 9/92, pp. 1–8.
"The Digitisation of Field Instruments" W. Van Der Bijl, *Journal A*, vol. 32, No. 3, 1991, pp. 62–65.
Specification Summary, "TELETRANS™ 3508–30A Smart Differential Pressure Transmitter," (undated) Bristol Babcock, Inc., Watertown, CT, 06795.
Specification Summary, "TELETRANS™ 3508–10A Smart Pressure Transmitter," (undated) Bristol Babcock, Inc., Watertown, CT, 06795.

Specification Summary, "AccuRate Advanced Gas Flow Computer, Model GFC 3308," (undated) Bristol Babcock, Inc., Watertown, CT, 06795.
Product Data Sheet PDS 4640, "Model 3201 Hydrostatic Interface Unit," Mar. 1992, Rosemount Inc., Eden Prairie, MN 55344.
Product Data Sheet PDS 4638, "Model 3001CL Flush–Mount Hydrostatic Pressure Transmitter," Jul. 1992, Rosemount Inc., Eden Prairie, MN 55344.
"Flow Measurement," *Handbook of Fluid Dynamics*, V. Streeter, Editor–in–chief, published by McGraw–Hill Book Company, Inc. 1961, pp. 14–4 to 14–15.
"Precise Computerized In–Line Compressible Flow Metering," *Flow—Its Measurement and Control in Science and Industry*, vol. 1, Part 2, Edited by R. Wendt, Jr., Published by American Institute of Physics et al, (undated) pp. 539–540.
"A Systems Approach," Dr. C. Ikoku, *Natural Gas Engineering*, PennWell Books, (undated) pp. 256–257.
"Methods for Volume Measurement Using Tank–Gauging Devices Can Be Error Prone," F. Berto, *The Advantages of Hydrostatic Tank Gauging Systems*, undated reprint from *Oil & Gas Journal*.
"Hydrostatic Tank Gauging—Technology Whose Time Has Come," J. Berto, *Rosemount Measurement Division Product Feature*, undated reprint from INTECH.
"Pressure Sensors Gauge Tank level and Fluid Density," *Rosemount Measurement Division Product Feature*, undated reprint from *Prepared Foods* (Copyrighted 1991 by Gorman Publishing Company).
"Low Cost Electronic Flow Measurement System," *Tech Profile*, May 1993, Gas Research Institute, Chicago, IL.
"Development of an Integrated EFM Device for Orifice Meter Custody Transfer Applications," S.D. Nieberle et al., *American Gas Association Distribution/Transmission Conference & Exhibit*, May 19, 1993.
Advertisement, AccuRate Model 3308 Integral Smart DP/P/T Transmitter, (undated) Bristol Babcock, Inc., Watertown, CT 06795.
Advertisement, Model 3508 DP Transmitter, *Control Engineering*, Dec. 1992, Bristol Babcock, Inc., Watertown, CT 06795.
"Smart Transmitters Tear Up The Market," C. Polsonetti, *INTECH*, Jul. 1993, pp. 42–45.
"MicroLAN Design Guide", Dallas Semiconductor, Tech Brief No. 1, (undated).
"Bosch CAN Specification Version 2.0", by Robert Bosch GmbH, pp. 1–68 including pp. –1–and –2–, (Sep. 1991).
Product Data Sheet No. 00813–0100–4001, "Digital Pressure Transmitter for Pressure, Flow, and Level Measurement", by Rosemount Inc., (1998).
"Claudius Ptolemy (100?–170? AD)", *M&C News*, 7 pages, (Apr. 1994).
American National Standard , "Hydraulic Fluid Power–Solenoid Piloted Industrial Valves–Interface Dimensions for Electrical Connectors", National Fluid Power Association, Inc., 10 pages, (Aug. 1981).
2 pages downloaded from http://www.interlinkbt.com/ PRODUCT/IBT—PROD/DN/CN–DM—PN/EURO–D-P.HTM dated Sep. 15, 2000.
4 pages downloaded from http://www.interlinkbt.com/ PRODUCT/IBT—PROD/dn/EUR–CON/euro–fwc.htm dated Sep. 15, 2000.

3 pages from TURK Cable Standards, by Turk, Inc., Minneapolis, Minnesota.

"Notification of Transmittal of the International Search Report or Declaration" for International application Ser. No. PCT/US00/26561.

"Notification of Transmittal of the International Search Report or Declaration" for International application Ser. No. PCT/US00/26488.

"Notification of Transmittal of the International Search Report or Declaration" for International application Ser. No. PCT/US00/26563.

U.S. patent application Ser. No. 09/862,762, Wang, filed May 21, 2001.

U.S. patent application Ser. No. 09/867,961, Fandrey et al., filed May 30, 2001.

THREE-PHASE EXCITATION CIRCUIT FOR COMPENSATED CAPACITOR INDUSTRIAL PROCESS CONTROL TRANSMITTERS

FIELD OF THE INVENTION

The present invention is related generally to industrial process control transmitters, and particularly to a sensor excitation circuit for use in such transmitters.

BACKGROUND OF THE INVENTION

Industrial process control transmitters are used to measure process variables in field locations and provide standardized transmission signals as a function of the measured variable. The term "process variable" refers to a physical or chemical state of matter or conversion of energy, such as pressure, temperature, flow, conductivity, pH, and other properties. Process control transmitters are often operated in hazardous field environments to measure these variables and are connected by two-wire communication lines to a central or control station.

One such transmitter is described in U.S. application Ser. No. 09/312,411 filed May 14, 1999 by Roger L. Frick and David A. Broden for "Pressure Sensor for a Pressure Transmitter", and assigned to the same assignee as the present invention. The Frick et al. transmitter employs a capacitive sensor having a deflectable sensing diaphragm and three or more capacitor electrodes forming separate capacitors with the diaphragm. Two of the capacitors are primary sensing capacitors that are arranged differentially so that the capacitances of the primary sensing capacitors change oppositely in proportion to the process variable. The third (and fourth, if used) capacitor is a compensation capacitor that provides signals representing certain offset errors associated with one or both of the primary sensing capacitors.

The Frick et al. transmitter includes a sigma-delta converter that acts as a capacitance-to-digital converter. An excitation circuit provides a charge packet to the capacitors of the sensor, which are charged by an amount based on the capacitance value of the capacitor. The charge is transferred to an integrator/amplifier of the sigma-delta converter to derive a signal representative of sensor capacitance. The signal is processed and a standardized transmission signal is transmitted to the central control station via the two-wire communication lines.

The excitation circuit of the Frick et al. application is operated such that each capacitor is charged by a charging voltage during a first phase and the charge is transferred to the integrator/amplifier during a second phase. The sensing capacitors and compensation capacitors are charged by the same charging voltage, necessitating the use of an inverting amplifier to invert one of the charges so that it may be subtracted from the other charge. The inverting amplifier introduces noise into the signal and consumes power.

SUMMARY OF THE INVENTION

The present invention is directed to a technique permitting the sensing and compensation capacitors to be charged oppositely so the need for a separate inverting amplifier is eliminated.

In accordance with the present invention, an industrial process control transmitter has a capacitive sensor with at least one sensing capacitor and at least one compensation capacitor. The sensing capacitor is charged with a first polarity during a first phase and the charge on the sensing capacitor is pumped to a sigma-delta capacitance-to-digital circuit during a second phase, mutually distinct from the first phase. The compensation capacitor is charged with a second polarity during the second phase and the charge on the second capacitor is pumped to the sigma-delta capacitance-to-digital circuit during a third phase.

In one form of the invention, the capacitive sensor includes a second sensing capacitor that is charged during the third phase.

A switch circuit selectively couples the sensing capacitors to a charging circuit to charge the sensor capacitors, and selectively couples the sensing capacitors to the sigma-delta circuit. The charge transferred is based on the charging level to the respective capacitor. A transmitter output circuit receives a digital output from the sigma-delta circuit and generates a standardized transmitter output for coupling to a remote receiver.

DETAILED DESCRIPTION OF THE PREFERRED EMBODIMENTS

The principal problem addressed by the present invention is that the prior amplifiers that inverted the charges from the compensation capacitors required considerable power. The power requirements of prior inverting amplifiers adversely affected performance, and left insufficient power available for other purposes, such as for diagnostic circuits. The present invention separately charges the sensing capacitors and compensation capacitors at the levels and polarities necessary for summing for the sigma-delta circuit, without the need for inverting amplifiers. Consequently, power requirements are reduced.

Figure 1:
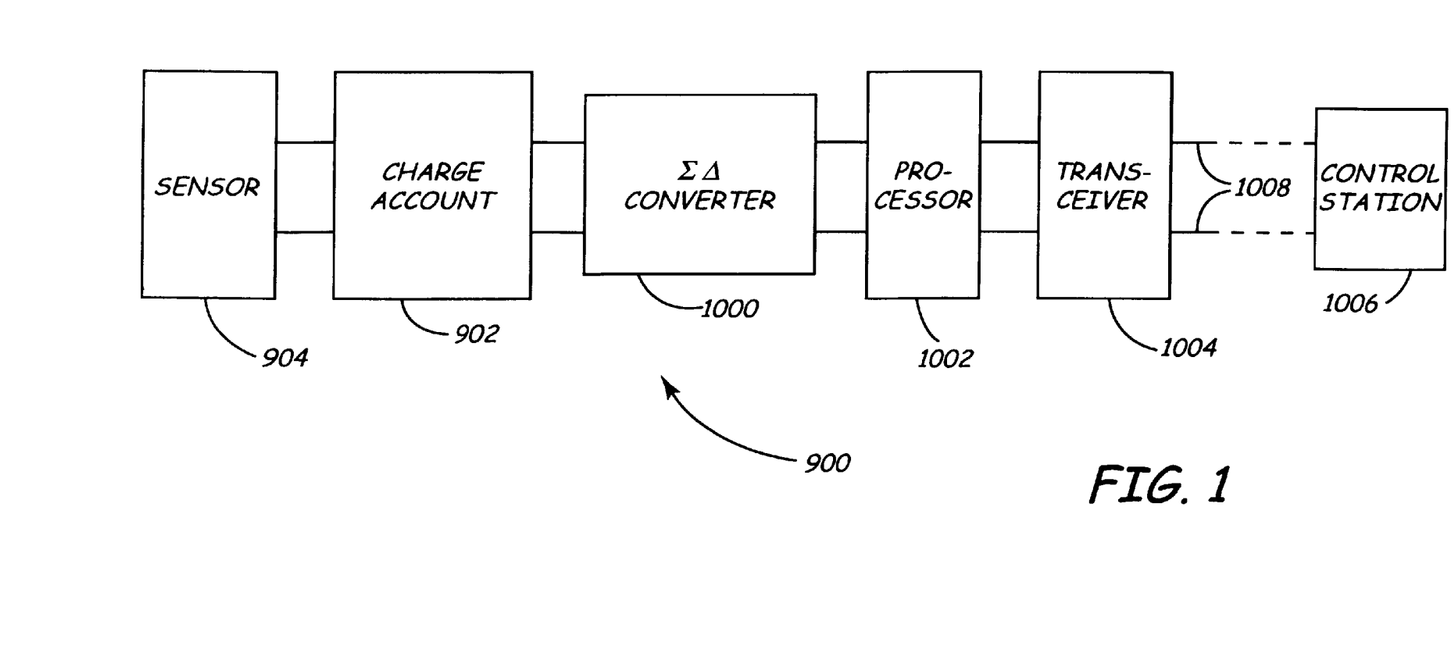
FIG. 1 is a block diagram of an industrial process control transmitter employing a sensor excitation circuit according to the present invention.

FIG. 1 is a block diagram of an industrial process control transmitter 900 having a sigma-delta circuit 1000 arranged to receive signals representative of a pressure from charge circuit 902 that charges pressure sensitive capacitors of sensor 904. Charges on the capacitors are representative of pressure, and of sensor hysteresis, and are transferred to circuit 1000 by charge circuit 902. Circuit 1000 converts the charges to digital signals which are processed by processor 1002 and input to transceiver 1004 which provides a standardized transmission signal in a protocol designed for transmission to central control station 1006 by a two-wire communication link 1008. Additionally, control station 1006 may send signals to remote industrial process control transmitter 900 by communication link 1008 which are received through transceiver 1004 to provide control to transmitter 900 in a manner well known in the art.

Figure 2:
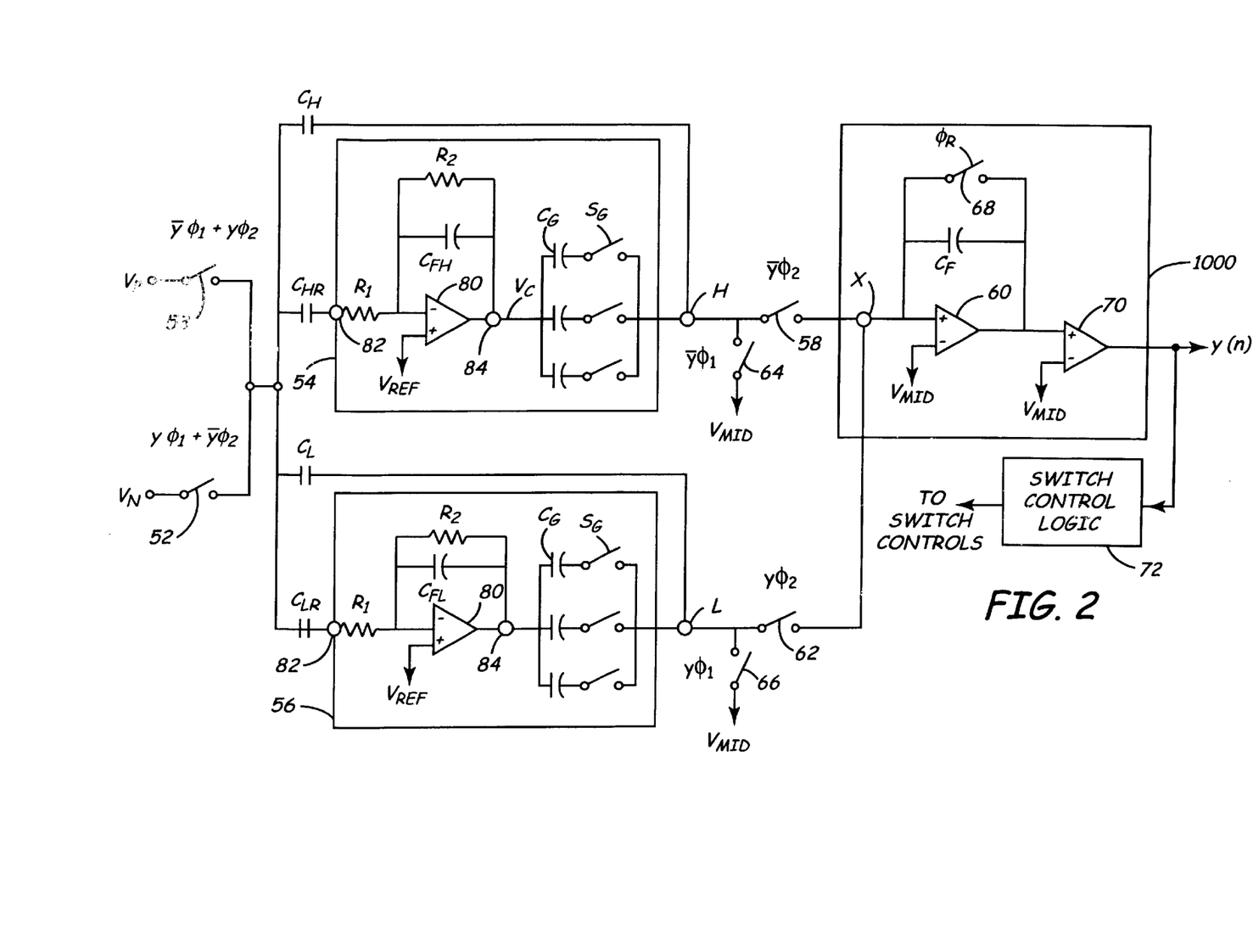
FIG. 2 is a circuit diagram illustrating the excitation and sigma-delta compensation circuit described in the Frick et al. application.

FIG. 2 is a circuit diagram illustrating the excitation circuit and sigma-delta circuit 1000 of an industrial process control transmitter described in the Frick et al. application. The capacitive sensor is schematically represented as sensing capacitors $C_H$ and $C_L$ and compensation capacitors $C_{HR}$ and $C_{LR}$. As described in the Frick et al. application, the sensor physically changes over time causing sensing errors, known as hysteresis. These errors are a common source of error in measuring the process variable condition by the industrial process control transmitter. The compensation capacitors $C_{HR}$ and $C_{LR}$ have a proportionately greater response to sensor hysteresis than the sensing capacitors $C_H$ and $C_L$.

An input side of each capacitor $C_H$, $C_L$, $C_{HR}$ and $C_{LR}$ is coupled through switches 50 and 52 to the respective supplies $V_P$ and $V_N$. The output sides of capacitors $C_{HR}$ and $C_{LR}$ are connected to respective inverter charge amplifiers circuits 54 and 56, the outputs of which are connected to the output of the respective capacitor $C_H$ and $C_L$ at nodes H and L, respectively. Nodes H and L are connected through respective switches 58 and 62 to node X at the negative input of amplifier 60, and through respective switches 64 and 66 to voltage source Vmid.

Amplifier 60 is an integrating amplifier that operates as an integrator amplifier for the first stage, or modulator stage, of sigma-delta capacitance-to-digital converter 1000. Amplifier 60 provides an increasingly negative output for an increasing positive signal input at the negative input, and provides an increasing positive output for an increasing negative signal input at the negative input. The output of amplifier 60 is connected to the positive input of comparator 70, whose output provides a digital output representing the capacitance ratio. The output of comparator 70 is also connected to switch control logic 72 to control operation of the switches.

Figure 3:
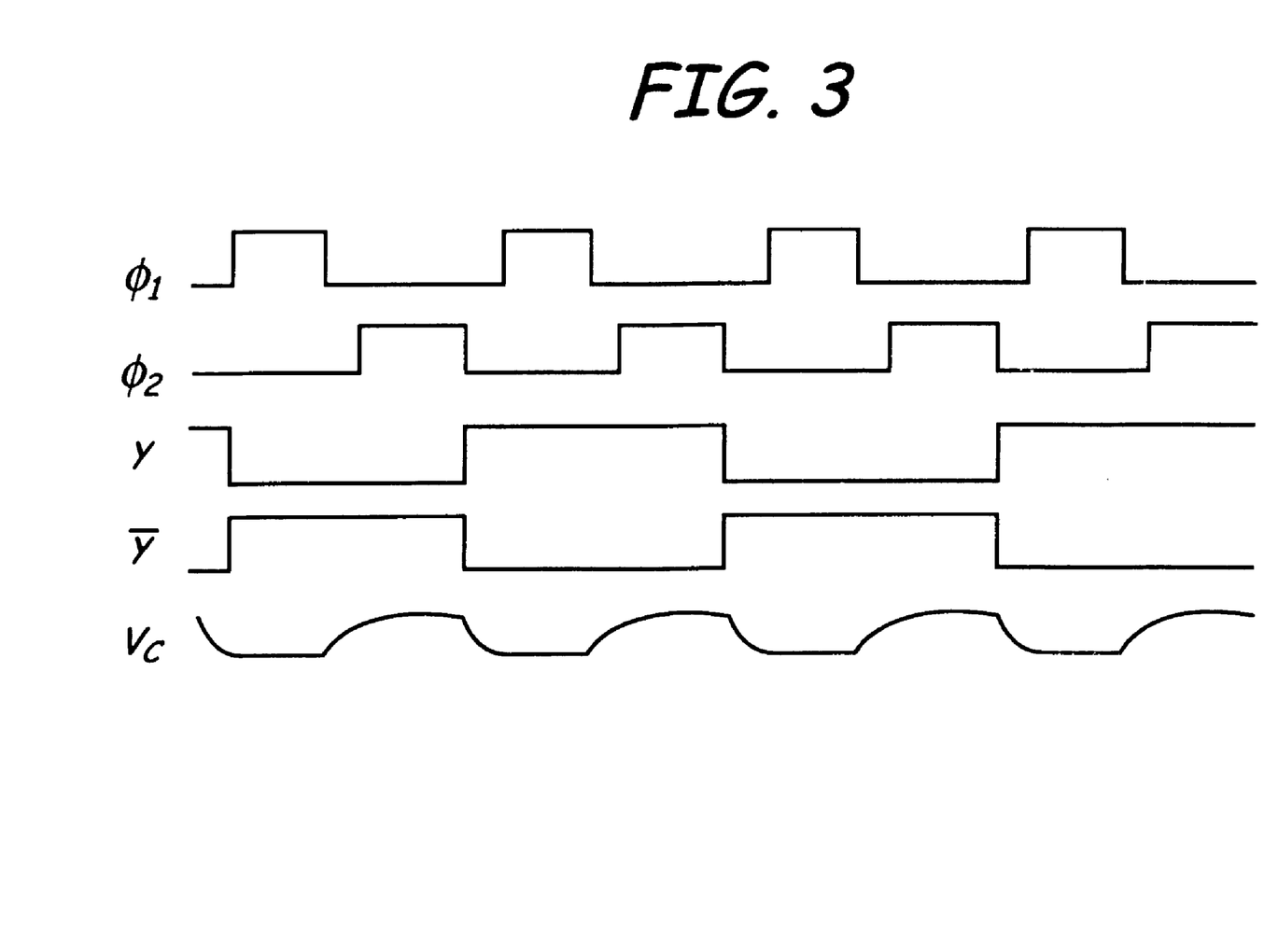
FIG. 3 is a timing diagram for the circuit illustrated in FIG. 2.

Switch control logic 72 provides four switch logic signals $\Phi_1$, $\Phi_2$, y and $\bar{y}$ (y-not), illustrated in FIG. 3. Signals $\Phi_1$ and $\Phi_2$ are non-overlapping phase signals, whereas signals y and $\bar{y}$ are complementary signals representing whether the circuit is operating in the positive or negative mode at a particular time. When operating in a positive mode, $\bar{y}$ is high, whereas when operating in a negative mode, y is high.

In the positive mode of the circuit ($\bar{y}$ high), switches 50 and 64 conduct during a first phase ($\Phi_1$) so the input sides of capacitors $C_H$ and $C_{HR}$ are at the positive voltage $V_P$ of the voltage supply. The output side of capacitor $C_H$ is at Vmid, which may be electrical ground, and the output side of capacitor $C_{HR}$ is at a voltage between $V_P$ and Vmid based on compensation capacitor(s) $C_G$.

While $\bar{y}$ is still high, during the second $\Phi_2$ phase, switches 52 and 58 conduct and 50 and 64 are non-conducting. With $V_N$ at the input of capacitor $C_H$, a negative charge representative of the capacitance value of capacitor $C_H$ is transferred to node H; with $V_N$ at the input of capacitor $C_{HR}$, a negative charge representative of the capacitance value of capacitor $C_{HR}$ is transferred to the negative input of inverter amplifier 80 of charge amplifier circuit 54. Capacitor(s) $C_G$ adjust the gain of amplifier 80 to set a constant $K_H$ based on the ratio of $C_G/C_{FH}$ for charge amplifier 54. Hence, the output of amplifier circuit 54 represents an adjusted inverted charge, $-K_H C_{HR}$, where $K_H$ is derived from the capacitor array $C_G$. The representation of $-K_H C_{HR}$ is summed with the representation of the charge on capacitor $C_H$ at node H. Switch 58 transfers the negative charge representation of $C_H - K_H C_{HR}$ from node H to node X at the negative input of amplifier 60. Amplifier 60 integrates the signal such that the negative input produces a positive change to the signal at the output of amplifier 60.

The circuit associated with capacitor $C_L$ and $C_{LR}$ operates in a similar manner during the phases while y is high to place a positive charge at the negative input of amplifier 60, thereby stepping the output of amplifier 60 negatively.

The circuit is reset by operating switch 68 during a reset phase $\Phi_R$ to discharge feedback capacitor $C_F$. Resistor $R_2$ has a high resistance (e.g., 100 megaohms) in parallel with feedback capacitor $C_{FN}$ to discharge capacitor $C_{FN}$ over the RC time constant of resistor $R_2$ and capacitor $C_{FN}$. The resistance of resistor $R_2$ must be large enough to minimally affect the transfer of charge to the integrator, yet small enough to effectively discharge capacitor $C_{FN}$ during resetting of the circuit. In practice, resistor R2 was chosen high enough as to minimally impact the integration of the charge signal, and require resetting of the circuit over a considerably longer time period.

One problem associated with the circuit illustrated in FIG. 2 is that operational amplifiers 80 have an input resistance $R_1$ of about 5,000 ohms. The input resistance of amplifiers 80, coupled with the small current available to the amplifiers to settle the output voltage, introduces delays in integrator settling. These delays are illustrated at waveform Vc in FIG. 3 which illustrates the slow settling of the output of amplifier 80. More particularly, the long settling times between triggering a change in the Vc voltage and settling to the new voltage level resulted in shortened periods of settled Vc voltage, resulting in reduced slew currents. The slow integrator settling creates measurement error at high sampling frequencies and deprives the circuit of adequate power to operate other diagnostic circuits. Moreover, the distorted waveform output $V_C$ may adversely affect the integrator settling of the first stage integrator 60 of sigma-delta converter 1000.

Another problem with the circuit illustrated in FIG. 2 is that amplifiers 80 were implemented as external amplifiers, connected by terminal 82 to the respective compensation capacitor $C_{HR}$ or $C_{LR}$, and by terminal 84 to gain capacitor array $C_G$. The connections to external amplifiers 80 introduced additional leakage paths and noise sources for the circuit.

Another problem of the circuit of FIG. 2 was that operational amplifiers 80 required the addition of two sample-and-hold amplifiers within amplifier 60 which added to the power consumption of the circuit, and diminished real estate (chip area) availability on the circuit boards.

It will be appreciated from the foregoing that the circuit shown in FIG. 2 charges the sensing capacitor and its associated compensation capacitor to the same polarity, requiring that one of the charges (e.g., that on the compensation capacitor) be inverted to be subtracted from the other charge. The present invention eliminates the need for inversion, and hence the inverting amplifiers 80, by charging the sensing and compensation capacitors oppositely. Moreover, the present invention eliminates the need for gain capacitor array $C_G$ by adjusting the charge voltage to the compensation capacitor.

Figure 4:
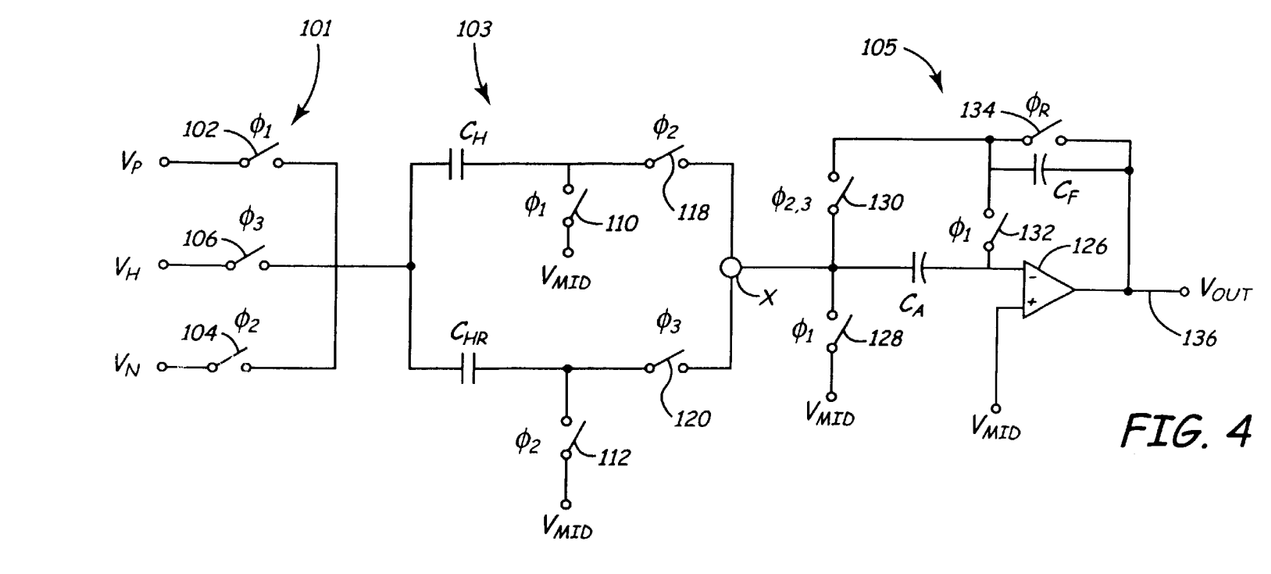
FIG. 4 is a circuit diagram of a portion of a three-phase excitation circuit illustrating the principles of the present invention.

FIG. 4 is a circuit diagram illustrating the structure and principles of operation of the three-phase excitation circuit according to the present invention for a capacitive sensor. FIG. 4 illustrates the excitation circuit for one-half of the sensor, namely one of the capacitors $C_H$ of the differential pair and its corresponding compensation capacitor $C_{HR}$. The circuit includes a charge circuit 101 that charges the sensor capacitors of sensor 103 for input to sigma-delta modulator 105. Charge circuit 101 includes voltage sources $V_P$, $V_N$ and $V_H$ coupled through respective switches 102, 104 and 106 to one side of the capacitors of sensor 103. Sensor 103 includes capacitor sensor $C_H$ and its companion compensation capacitor $C_{HR}$. Conveniently, the output of the charge circuit may be connected to the conductive diaphragm of sensor 103, and the opposite sides of sensor capacitors $C_H$ and $C_{HR}$ are coupled through switches 110 and 112 to voltage source Vmid and through respective switches 118 and 120 to node X at the input of circuit 105. Circuit 105 is the first stage integrator circuit of a sigma-delta converter that converts the capacitance values to digital representations. The value of voltage source Vmid is preferably mid-way between the values of the $V_P$ and $V_N$ voltages. In one preferred form, voltage sources $V_P$ and $V_N$ have equal and opposite values at +5 volts and −5 volts, respectively, Vmid is electrically grounded and $V_H$ is an intermediate voltage between $V_P$ and Vmid.

Integrator 105 includes differential amplifier 126 having its positive input connected to Vmid and its negative input connected through capacitor $C_A$ to the output node X of sensor 103. Switch 128 selectively couples the negative input of integrator 105 to Vmid, and switch 130 selectively couples the negative input of integrator 105 to one side of feedback capacitor $C_F$. Switch 132 selectively couples the negative input of amplifier 126 to the one side of capacitor $C_F$. The opposite side of feedback capacitor $C_F$ is connected to the output of amplifier 126. Switch 134 is connected in parallel with feedback capacitor $C_F$ to reset the circuit.

Figure 5:
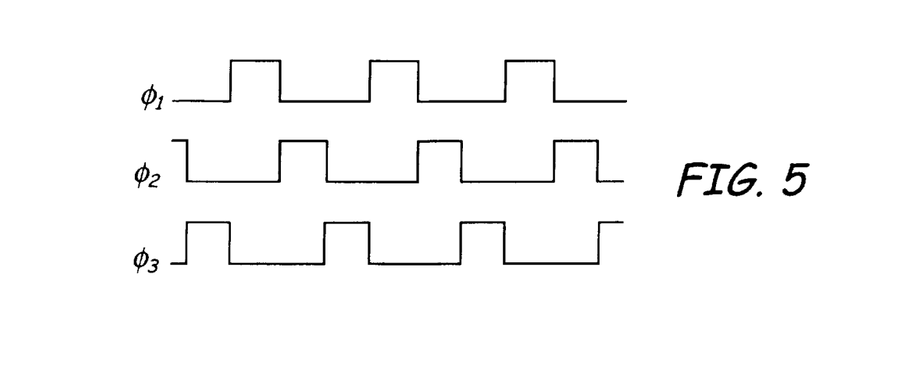
FIG. 5 is a timing diagram for the circuit portion illustrated in FIG. 4.

FIG. 5 is a timing diagram for the three phases for operating the switches of the excitation circuit illustrated in FIG. 4. More particularly, during a first phase $\Phi_1$, switches 102, 110, 128 and 132 are closed, or conducting, and the remaining switches are open, or non-conducting. During the second phase $\Phi_2$, switches 104, 112, 118 and 130 are closed, or conducting, and the remaining switches are open, or non-conducting. During the third phase, $\Phi_3$, switches 106, 120 and 130 are closed, or conducting, and the remaining switches are open, or non-conducting.

Figure 6:
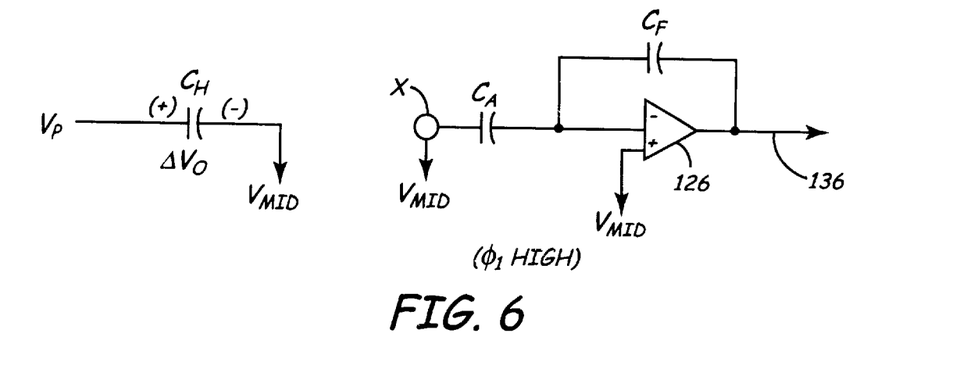
FIGS. 6–8 are equivalents of the circuit portion illustrated in FIG. 4 for each of the three phases.
Figure 7:
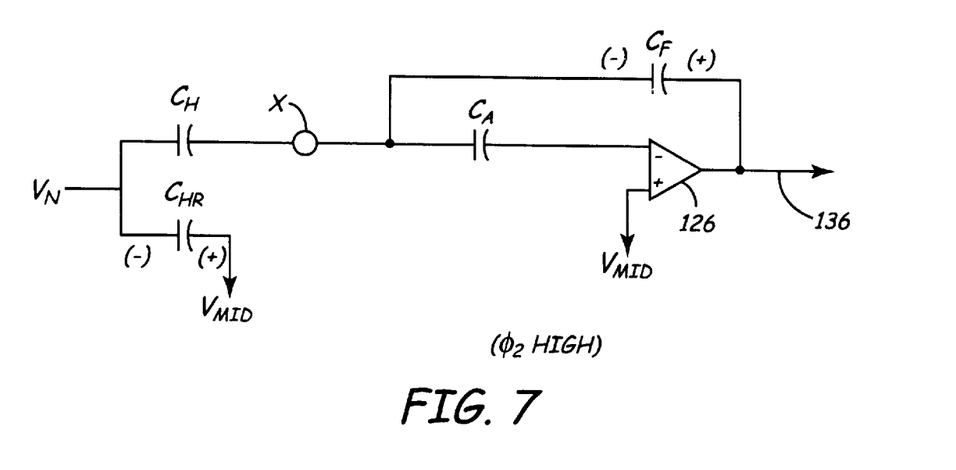
Figure 8:
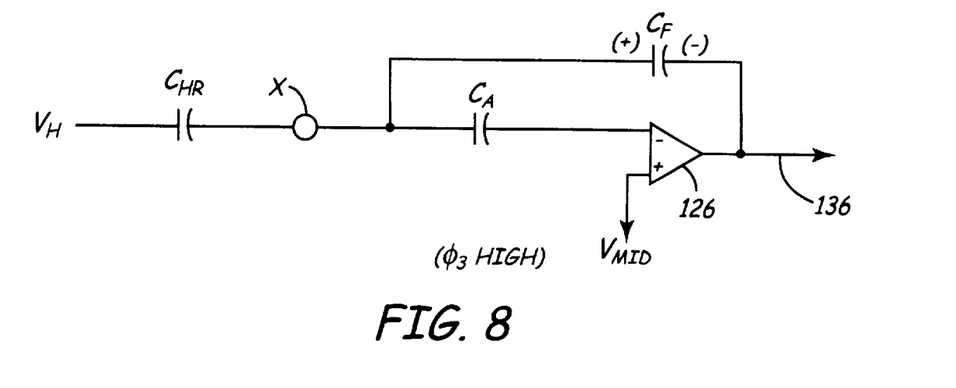

FIGS. 6–8 illustrate the circuit of FIG. 4 during each of the three phases. As shown in FIG. 6, during a first phase, when $\Phi_1$ is high and switches 102, 110, 128 and 132 are conducting, a high positive voltage $V_P$ is provided to one side of sensor capacitor $C_H$, while the other side is disconnected from node X and connected to Vmid. Based on the size of capacitor $C_H$, which is based on the variable being sensed, a voltage $\Delta V_o$ appears across capacitor $C_H$, placing a negative charge representative of the voltage on the output side of the capacitor. At the same time, node X is connected to Vmid through switch 128 so that any offset in integrator 105 is stored in capacitor $C_A$.

During the second phase of the operation of the circuit, illustrated in FIG. 7, $\Phi_2$ is high, rendering switches 104, 112, 118 and 130 conductive, configuring the circuit as illustrated in FIG. 7. Consequently, node X is disconnected from Vmid and couples capacitor $C_H$ to feedback capacitor $C_F$. In this condition, the negative charge on capacitor $C_H$ is transferred to the feedback capacitor $C_F$. Since feedback capacitor $C_F$ provides a negative feedback for amplifier 126, amplifier 126 produces a positive step in its output voltage at output 136. The output voltage, $V_{\Phi 1}$, at output 136 is represented as $$V_{\Phi 1} = \frac{C_H}{C_F}(2\Delta V_o).$$

During this same period, a negative voltage $V_N$ is applied to compensation capacitor $C_{HR}$ to charge capacitor $C_{HR}$ with a positive charge at its output.

During the third phase, $\Phi_3$, the equivalent circuit is illustrated in FIG. 8 with node X coupling compensation capacitor $C_{HR}$ and feedback capacitor $C_F$. The positive charge on capacitor $C_{HR}$ is transferred to the feedback capacitor $C_F$ pumping a charge into the integrator, creating a negative step to the output voltage, $V_{\Phi 2}$, at output 136, represented by $$V_{\Phi 2} = -\frac{C_{HR}}{C_F}\Delta V_H.$$

The output voltage, Vout, from the first stage 105 of the sigma-delta circuit is the sum of $V_{\Phi 1}$ and $V_{\Phi 2}$ and is represented by $$V_{out} = \frac{C_H}{C_F}(2\Delta V_o) - \frac{C_{HR}}{C_F}\Delta V_H,$$

which may be represented as $$V_{out} = \frac{2\Delta V_o}{C_F}[C_H - K_H C_{HR}],$$

$$\text{where } K_H = \frac{\Delta V_H}{2\Delta V_o}.$$

It will be appreciated that $K_H$ may be set by establishing a value of voltage $V_H$ to meet factory calibration requirements. Therefore, where the circuit of FIG. 2 established the gain for the compensation capacitor $C_{HR}$ by the capacitor array, the circuit of FIG. 4 establishes the gain for compensation capacitor $C_{HR}$ by selecting a desired voltage $V_H$. Consequently, during operation of the positive side of the charge circuit illustrated in FIG. 4, the voltage steps at the output of amplifier 126 are proportional to $C_H - K_H C_{HR}$.

Figure 9:
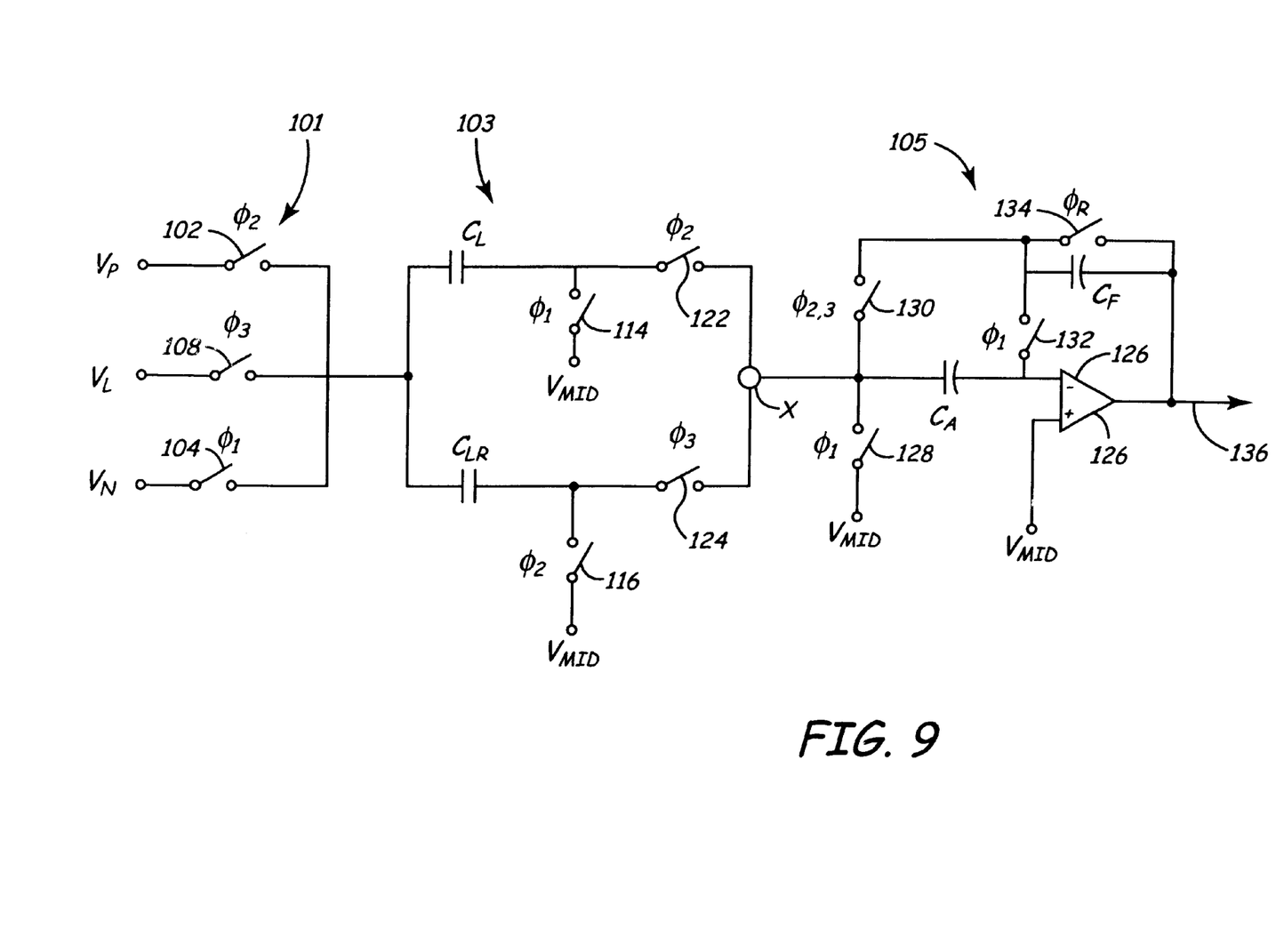
FIG. 9 is a circuit diagram of another portion of a three-phase excitation circuit.

FIG. 9 illustrates the negative side of the charge circuit and sensor 101 and 103 and adds switch 108 coupled to the lower charge voltage $V_L$, as well as the second half of the differential sensor $C_L$ and its corresponding compensation capacitor $C_{LR}$. The output sides of capacitor $C_L$ and $C_{LR}$ are coupled through switches 114 and 116 to Vmid, previously described, and are coupled through switches 122 and 124 to compensator circuit 105, previously described. When operating with the negative side of the sensor, switches 104, 114, 128 and 132 are conducting during phase 1, $\Phi_1$, while the other switches are non-conducting. During the second phase, $\Phi_2$, switches 102, 116, 124 and 130 are conductive and the other switches non-conductive. During the third phase, $\Phi_3$, switches 108, 124 and 130 are conductive and the other switches non-conductive.

The operation of the circuit illustrated in FIG. 9 is essentially the same as that of FIG. 4, except that Vmid is higher than $V_L$ so that the circuit transfers a negative charge packet to the sensor and converter. Consequently, the positive and negative supply voltages $V_P$ and $V_N$ are operated oppositely so voltage $V_N$ provides the charging voltage to capacitor $C_L$ during the first phase $\Phi_1$ and voltage $V_P$ provides the charging voltage to capacitor $C_{LR}$ during the second phase $\Phi_2$. Hence, during operation of the negative portion of the circuit illustrated in FIG. 9, the voltage steps at the output of amplifier 126 are proportional to $C_L - K_L C_{LR}$.

Figures 10, 11:
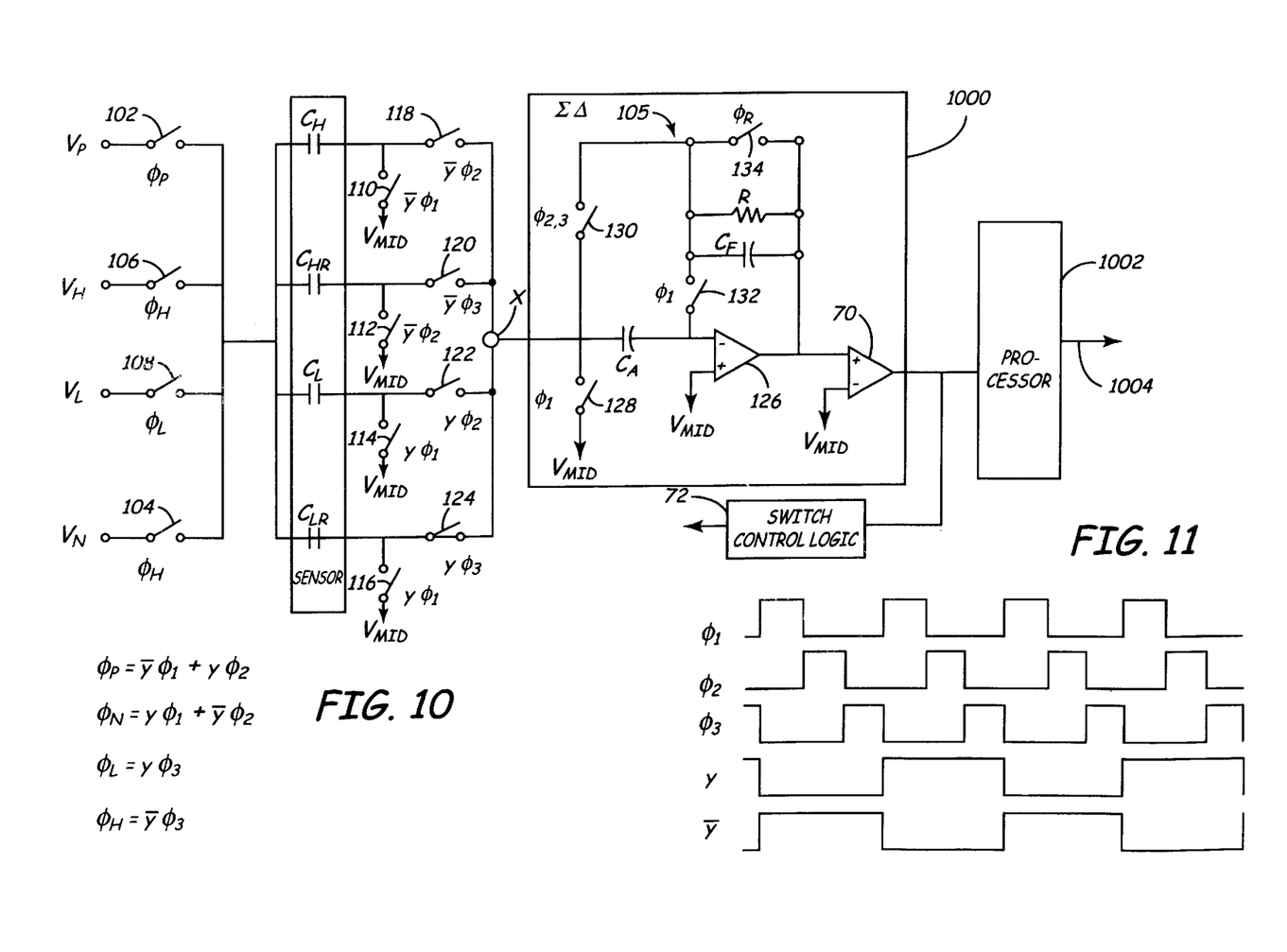
FIG. 10 is a circuit diagram of a three-phase excitation circuit according to the present invention.
FIG. 11 is a timing diagram for the circuit illustrated in FIG. 10.

FIG. 10 illustrates the entire transmitter circuit, including the circuit that is a composite of FIGS. 4 and 8, as well as sigma-delta circuit 1000, with its modulator stage 105 and controller stage including comparator 70. The output of sigma-delta circuit 1000 is supplied to digital processor 1002 which derives a standardized signal for transmission to a central receiving station via a two-wire communication system 1004. Communication system 1004 is, for example a 4–20 milliAmpere (mA) communication system available from Rosemount Inc. of Eden Prairie, Minn.

FIG. 11 illustrates the timing diagram for FIG. 10, the signals being derived by switch control logic 72 coupled to the output of circuit 1000. Signals $\Phi_1$, $\Phi_2$ and $\Phi_3$ are the same as illustrated in FIG. 4; signals y and $\bar{y}$ control whether the circuit is operating on the positive or the negative side, $\bar{y}$ being the complement of y. The negative side of the circuit operates when signal y is high and the positive side operates when signal $\bar{y}$ is high. Hence, switches 110, 112 118 and 120 are conducting when $\bar{y}$ is high and switches 114, 116 122 and 124 are conducting when y is high. Switch 102 conducts during the first phase when $\bar{y}$ is high and during the second phase when y is high ($\Phi_P = \bar{y}\Phi_1 + y\Phi_2$), switch 104 conducts during the first phase when y is high and during the second phase when $\bar{y}$ is high ($\Phi_N = \bar{y}\Phi_2 + y\Phi_1$), switch 106 conducts during the third phase when $\bar{y}$ is high ($\Phi_H = \bar{y}\Phi_3$) and switch 108 conducts during the third phase when y is high ($\Phi_L = y\Phi_3$).

Switch control circuit 72 provides signal outputs illustrated in FIG. 11 representing the three phases $\Phi_1$, $\Phi_2$ and $\Phi_3$, as well as the y and $\bar{y}$ mode signals to operate the switches illustrated in FIG. 10 during respective ones of six time periods, designated $\bar{y}\Phi_1$, $\bar{y}\Phi_2$, $\bar{y}\Phi_3$, $y\Phi_1$, $y\Phi_2$ and $y\Phi_3$. Switch control logic 72 includes timing circuits that generate the $\Phi_1$, $\Phi_2$, $\Phi_3$, y and $\bar{y}$ signals, as well as logic circuitry consisting of simple AND and OR gates to generate the proper phase relationships.

Offset capacitor $C_A$ serves to compensate for offset in differential amplifier 126 during operation of the circuit. More particularly, during the first phase ($\Phi_1$) of both modes, switches 128 and 132 are conducting, thereby storing a charge in capacitor $C_A$ representative of any voltage offset in amplifier 126. During the second and third phases ($\Phi_2$ and $\Phi_3$), the charge on feedback capacitor $C_F$ is adjusted by the output from the sensor through switch 130 so that the output of amplifier 126 represents the sensor output, compensated for offset of the amplifier.

To reset the circuit, switch 134 in parallel with feedback capacitor $C_F$ is operated to conduction during a reset phase $\Phi R$ to discharge feedback capacitor $C_F$, thereby resetting the charge on capacitor $C_F$.

The present invention thus provides a three-phase excitation circuit for an industrial process control transmitter that charges sensor capacitors and transfers charge representations to the integrator without introducing delays in integrator settling, and without measurement error at high sampling frequencies. The circuit of the present invention eliminates the need for external operational amplifiers that introduced leakage paths and noise sources. The circuit of the present invention eliminates the need for additional sample-and-hold amplifiers as required in prior circuits which require additional power consumption and diminish the availability of real estate on the circuit boards in the transmitter.

The compensation charge is based, in part, on the value of voltages $V_L$ and $V_H$, which are calibrated at the factory and re-set in the field as desired. Using a digitally controlled voltage source for $V_L$ and $V_H$, the gain adjustment of the charge transferred from compensation capacitors $C_{LR}$ and $C_{HR}$ may be digitally set and changed.

Although the present invention has been described with reference to preferred embodiments, workers skilled in the art will recognize that changes may be made in form and detail without departing from the spirit and scope of the invention.

What is claimed is:

1. A pressure sensor having first and second capacitors each responsive to pressure and to sensor hysteresis, the sensor comprising:

a charging circuit having a first charging level having a first polarity, a second charging level having a second polarity opposite the first polarity and third charging level that is intermediate the first and second charging levels;

a sensing circuit that is a sigma-delta capacitance-to-digital circuit providing a digital output representative of the pressure; and a switch circuit selectively coupling the first and second capacitors to the charging circuit to charge the first and second capacitors, and selectively coupling the first and second capacitors to the sensing circuit to transfer charge from the first capacitor based on the first and second charging levels and to transfer charge from the second capacitor based on the second and third charging levels.

2. The pressure sensor of claim 1, wherein the switch circuit includes:

a first switch operable to couple an input of the first capacitor to the first charging level;

a second switch operable to couple an output of the first capacitor to the sensing circuit and to couple inputs of the first and second capacitors to the second charging level;

a third switch operable to couple the input of the second capacitor to the third charging level and to couple an output of the second capacitor to the sensing circuit; and a switch control responsive to the sensing circuit for operating the first, second and third switches in sequence.

3. The pressure sensor of claim 2, wherein the charging circuit supplies a fourth charging level that is midway between the first and second charging levels, the first switch being further operable to couple the output of the first capacitor to the fourth charging level.

4. The pressure sensor of claim 3, wherein the second switch is further operable to couple the output of the second capacitor to the fourth charging level.

5. The pressure sensor of claim 3, wherein the sensing circuit includes:

an integrating amplifier having a first input connected to the fourth charging level, a second input and an output, a feedback capacitor, the first switch being further operable to couple the feedback capacitor between the amplifier output and the amplifier second input, the second switch being further operable to couple the feedback capacitor between the amplifier output and the first capacitor, and the third switch being further operable to couple the feedback capacitor between the amplifier output and the second capacitor.

6. The pressure sensor of claim 5, wherein the third charging level is between the first and fourth charging levels and the charging circuit supplies a fifth charging level that is between the second and fourth charging levels, the sensor further including a fourth capacitor, the switch control is responsive to the sensing circuit to operate the first, second and third switches during respective first and second sets of phases, the first switch is operable during a first phase of the first set to couple the input of the first capacitor to the first charging level and is operable during the first phase of the second set to couple an input of the third capacitor to the second charging level, the second switch is operable during a second phase of the first set to couple the output of the first capacitor to the sensing circuit and is operable during the second phase of the second set to couple an output of the third capacitor to the sensing circuit and to couple the fifth charging level to an input of the fourth capacitor, and the third switch is operable during a third phase to couple the feedback capacitor between the amplifier output and the fourth capacitor.

7. The pressure sensor of claim 6, wherein the second switch is coupled to the feedback capacitor to couple the feedback capacitor between the amplifier output and the first capacitor during the second phase of the first set and to couple the feedback capacitor between the amplifier output and the third capacitor during the second phase of the second set, and the third switch is coupled to the feedback capacitor to couple the feedback capacitor between the amplifier output and the second capacitor during the third phase of the first set and to couple the feedback capacitor between the amplifier output and the fourth capacitor during the third phase of the second set.

8. The pressure sensor of claim 1, including third and fourth capacitors responsive to pressure and to sensor hysteresis, and wherein the charging circuit has a fourth charging level that is intermediate the first and second charging levels, the switch circuit selectively coupling the third and fourth capacitors to the charging circuit to charge the third and fourth capacitors, and selectively coupling the third and fourth capacitors to the sensing circuit to transfer charge from the third capacitor based on the first and second charging levels and to transfer charge from the fourth capacitor based on the first and fourth charging levels.

9. The pressure sensor of claim 8, wherein the switch circuit includes:

a first switch operable to couple an input of the first capacitor to the first charging level;

a second switch operable to couple an output of the first capacitor to the sensing circuit and to couple inputs of the first and second capacitors to the second charging level;

a third switch operable to couple the input of the second capacitor to the third charging level and to couple an output of the second capacitor to the sensing circuit;

a fourth switch operable to couple an input of the third capacitor to the second charging level;

a fifth switch operable to couple an output of the third capacitor to the sensing circuit and to couple inputs of the third and fourth capacitors to the first charging level;

a sixth switch operable to couple an input of the fourth capacitor to the fourth charging level and an output of the fourth capacitor to the sensing circuit; and a switch control responsive to the sensing circuit for operating the first, second, third, fourth, fifth and sixth switches in sequence.

10. The pressure sensor of claim 9, wherein the charge circuit supplies a fifth charging level that is midway between the first and second charging levels, the third charging level being between the first and fifth charging levels, and the fourth charging level being between the second and fifth charging levels, and the first switch is operable to couple the output of the first capacitor to the fourth charging level, and the fourth switch is operable to couple the output of the second capacitor to the fifth charging level.

11. The pressure sensor of claim 10, wherein the second switch is further operable to couple the output of the second capacitor to the fifth charging level, and the fifth switch is operable to couple the output of the fourth capacitor to the fifth charging level.

12. The pressure sensor of claim 1 coupled to an industrial process control transmitter, further including a transmitter output circuit receiving the digital output and generating a standardized transmitter output adapted for coupling to a remote receiver.

13. An industrial process control transmitter comprising:

a pressure sensor having first and second capacitors each having a capacitance responsive to pressure and to sensor hysteresis;

a charging circuit having a first charging level having a first polarity, a second charging level having a second polarity opposite the first polarity and third charging level that is intermediate the first and second charging levels;

a sigma-delta capacitance-to-digital circuit providing a digital output representative of an analog input;

a switch circuit selectively coupling the first and second capacitors to the charging circuit to charge the first and second capacitors and selectively coupling the first and second capacitors to the capacitance-to-digital circuit to transfer an analog signal from the first capacitor based on the capacitance of the first capacitor and the first charging level and to transfer an analog signal from the second capacitor based on the capacitance of the second capacitor and the second and third charging levels; and a transmitter output circuit responsive to the digital output to generate a standardized transmitter output adapted for coupling to a remote receiver.

14. The industrial process control transmitter of claim 13, wherein the switch circuit selectively couples the first capacitor to the capacitance-to-digital circuit so that the analog signal transferred from the first capacitor is based on the first and second charging levels.

15. The industrial process control transmitter of claim 14, wherein the switch circuit includes:

a first switch operable to couple an input of the first capacitor to the first charging level;

a second switch operable to couple an output of the first capacitor to the capacitance-to-digital circuit and to couple an input of the second capacitor to the second charging level;

a third switch operable to couple the input of the second capacitor to the third charging level and to couple an output of the second capacitor to the capacitance-to-digital circuit; and a switch control responsive to the sensing circuit for operating the first, second and third switches in sequence.

16. The industrial process control transmitter of claim 14, wherein the pressure sensor includes third and fourth capacitors responsive to pressure and to sensor hysteresis, and wherein the capacitance-to-digital circuit has a fourth charging level that is intermediate the first and second charging levels, the switch circuit selectively coupling the third and fourth capacitors to the charging circuit to charge the third and fourth capacitors, and selectively coupling the third and fourth capacitors to the capacitance-to-digital circuit to transfer an analog signal from the third capacitor to the capacitance-to-digital circuit based on the first and second charging levels and to transfer an analog signal from the fourth capacitor to the capacitance-to-digital circuit based on the first and fourth charging levels.

17. The industrial process control transmitter of claim 16, wherein the switch circuit includes:

- a first switch operable to couple an input of the first capacitor to the first charging level;
- a second switch operable to couple an output of the first capacitor to the capacitance-to-digital circuit and to couple inputs of the first and second capacitors to the second charging level;
- a third switch operable to couple the input of the second capacitor to the third charging level and to couple an output of the second capacitor to the capacitance-to-digital circuit;
- a fourth switch operable to couple an input of the third capacitor to the second charging level;
- a fifth switch operable to couple an output of the third capacitor to the capacitance-to-digital circuit and to couple inputs of the third and fourth capacitors to the first charging level;
- a sixth switch operable to couple an input of the fourth capacitor to the fourth charging level and an output of the fourth capacitor to the capacitance-to-digital circuit; and
- a switch control responsive to the sensing circuit for operating the first, second, third, fourth, fifth and sixth switches in sequence.

18. A process of operating a pressure sensor having first and second capacitors each responsive to pressure and to sensor hysteresis, the process comprising steps of:

(a) charging the first capacitor to a first polarity during a first phase;

(b) pumping a charge on the first capacitor to a sigma-delta capacitance-to-digital circuit during a second phase that is mutually exclusive from the first phase;

(c) charging the second capacitor to a second polarity opposite the first polarity during the second phase; and (d) pumping a charge on the second capacitor to the sigma-delta capacitance-to-digital circuit during a third phase that is mutually exclusive from the first and second phases.

19. The process of claim 18, wherein the sigma-delta capacitance-to-digital circuit includes an amplifier, and an offset capacitor coupled to an input of the amplifier to adjust for amplifier offset, the process further including the step of:

(e) charging the offset capacitor to represent the amplifier offset during the first phase.

20. The process of claim 18, wherein pressure sensor further includes third and fourth capacitors responsive to pressure and to sensor hysteresis, and steps (a)–(d) are performed during a first set of first, second and third phases, the process further comprising steps of, during a second set of first, second and third phases:

(e) charging the third capacitor to the second polarity during the first phase, (f) pumping a charge on the second capacitor to the sigma-delta capacitance-to-digital circuit during the second phase, (g) charging the fourth capacitor to the first polarity during the second phase, and (h) pumping a charge on the fourth capacitor to the sigma-delta capacitance-to-digital circuit during the third phase.

21. The process of claim 20, wherein the sigma-delta capacitance-to-digital circuit includes an amplifier, and an offset capacitor coupled to an input of the amplifier to adjust for amplifier offset, the process further including the step of:

(i) charging the offset capacitor to represent the amplifier offset during the first phases.

* * * * *

UNITED STATES PATENT AND TRADEMARK OFFICE
CERTIFICATE OF CORRECTION

PATENT NO. : 6,684,711 B2
DATED : February 3, 2004
INVENTOR(S) : Wang

It is certified that error appears in the above-identified patent and that said Letters Patent is hereby corrected as shown below:

Title page,
Item [56], References Cited, U.S. PATENT DOCUMENTS, please add
-- 5,988,203 Hutton 11/1999 137/597 --.
OTHER PUBLICATIONS, please add
-- U.S. patent application Ser. No. 09/671,495, Behm et al., filed Sept. 27, 2000.
U.S. patent application Ser. No. 09/519,781, Nelson et al., filed March 7, 2000.
U.S. patent application Ser. No. 09/862,762, Wang, filed May 21, 2001.
U.S. patent application Ser. No. 09/867,961, Fandrey et al., filed May 30, 2001. --

Signed and Sealed this

Twenty-second Day of March, 2005

JON W. DUDAS
*Director of the United States Patent and Trademark Office*